US010596798B2

(12) United States Patent
Mantell et al.

(10) Patent No.: US 10,596,798 B2
(45) Date of Patent: Mar. 24, 2020

(54) SINGLE EXTRUDER CONFIGURATION THAT ENABLES MULTI-COLOR EXTRUSIONS IN THREE-DIMENSIONAL OBJECT PRINTERS

(71) Applicant: Xerox Corporation, Norwalk, CT (US)

(72) Inventors: David A. Mantell, Rochester, NY (US); Peter J. Nystrom, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 399 days.

(21) Appl. No.: 15/350,200

(22) Filed: Nov. 14, 2016

(65) Prior Publication Data
US 2018/0133980 A1 May 17, 2018

(51) Int. Cl.
*B29C 67/00* (2017.01)
*B29C 47/30* (2006.01)
(Continued)

(52) U.S. Cl.
CPC .............. *B33Y 10/00* (2014.12); *B29C 48/30* (2019.02); *B29C 48/345* (2019.02); *B29C 64/106* (2017.08); *B29C 64/118* (2017.08); *B29C 64/20* (2017.08); *B29C 64/209* (2017.08); *B29C 64/336* (2017.08); *B29C 64/386* (2017.08); *B33Y 30/00* (2014.12); *B33Y 50/02* (2014.12); *B29K 2105/0067* (2013.01)

(58) Field of Classification Search
CPC ... B29C 64/118; B29C 64/336; B29C 64/209; B29C 64/20; B29C 47/30
USPC ..................... 425/387.1, 378.2, 382 R, 382.2
See application file for complete search history.

(56) References Cited

U.S. PATENT DOCUMENTS 8,827,684 B1   9/2014 Schumacher et al.
2014/0034214 A1   2/2014 Boyer et al.
(Continued)

FOREIGN PATENT DOCUMENTS

DE    20 2014 004 344 U1    8/2014

OTHER PUBLICATIONS

European Search Report related to European Application No./Patent No. 17 20 1194.2-1019; dated Apr. 17, 2018; 9 Pages.
(Continued)

*Primary Examiner* — Joseph S Del Sole
*Assistant Examiner* — Mohamed K Ahmed Ali
(74) *Attorney, Agent, or Firm* — Maginot Moore & Beck LLP

(57) ABSTRACT

An additive manufacturing system has a plurality of manifolds in an extruder. Each manifold is connected to at least one nozzle of the extruder to enable the at least one nozzle to extrude thermoplastic material through a corresponding aperture in a faceplate mounted to the extruder. A plurality of valves is configured between each manifold and each nozzle connected to the manifold to enable the nozzles connected to a manifold to extrude thermoplastic material from the manifold selectively. The faceplate is also configured for rotation about an axis perpendicular to the faceplate to enable different orientations of the nozzles in the apertures of the faceplate. The different manifolds of the extruder enable a plurality of thermoplastic materials having a different property to be extruded simultaneously so the materials can join to one another while the materials are at an elevated temperature.

10 Claims, 5 Drawing Sheets

(51) Int. Cl.

| | |
|---|---|
| *B33Y 10/00* | (2015.01) |
| *B33Y 30/00* | (2015.01) |
| *B33Y 50/02* | (2015.01) |
| *B29C 48/30* | (2019.01) |
| *B29C 48/345* | (2019.01) |
| *B29C 64/118* | (2017.01) |
| *B29C 64/209* | (2017.01) |
| *B29C 64/336* | (2017.01) |
| *B29C 64/20* | (2017.01) |
| *B29C 64/386* | (2017.01) |
| *B29C 64/106* | (2017.01) |
| *B29K 105/00* | (2006.01) |

(56) References Cited

U.S. PATENT DOCUMENTS

| | | | |
|---|---|---|---|
| 2014/0242208 A1* | 8/2014 | Elsworthy | B29C 31/042 425/375 |
| 2014/0363532 A1 | 12/2014 | Wolfgram | |
| 2015/0093465 A1 | 4/2015 | Page | |
| 2016/0129644 A1 | 5/2016 | Hara et al. | |
| 2016/0325498 A1 | 11/2016 | Gelbart | |

OTHER PUBLICATIONS

Alec; The Palette multi-color 3D printing add-on launches now on Kickstarter; 3D Printer News & 3D Printing News; Apr. 21, 2015; 11 Pages; www.3ders.org.

Kim; Best Practice: Multicolor 3D Printed Parts for FDM; Advanced RP Blog, 3D Printing, Best Practices; Jul. 13, 2015; 6 Pages; www.advancedrp.com.

Stratasys Application Engineering; FDM Best Practice: Switching FDM Material Color; Stratasys 3D Printers and Production Systems; 2015; 6 Pages; www.stratasys.com/solutions-application.

James Chang; FDM multi-feed mixed color nozzle 5 in 1 out; YouTube; Nov. 21, 2014; 3 Pages; www.youtube.com Kevin Lee; How does the world's first full-color 3D printer work? We ask its creators; PCWorld; May 24, 2013; 7 Pages; www.PCWorld.com.

Brian Krassenstein; Spectrom 3D Divulges Plans for Individual Voxel Coloring within FFF 3D Printing Process; 3D Print; Jan. 12, 2015; 5 Pages; www.3dprint.com/36211/spectrom-3d/.

* cited by examiner

SINGLE EXTRUDER CONFIGURATION THAT ENABLES MULTI-COLOR EXTRUSIONS IN THREE-DIMENSIONAL OBJECT PRINTERS

TECHNICAL FIELD

This disclosure is directed to extruders used in three-dimensional object printers and, more particularly, to the production of three-dimensional object using multiple extrusions of different colors.

BACKGROUND

Three-dimensional printing, also known as additive manufacturing, is a process of making a three-dimensional solid object from a digital model of virtually any shape. Many three-dimensional printing technologies use an additive process in which an additive manufacturing device forms successive layers of the part on top of previously deposited layers. Some of these technologies use extruders that soften or melt extrusion material, such as ABS plastic, into thermoplastic material and then emit the thermoplastic material in a predetermined pattern. The printer typically operates the extruder to form successive layers of the thermoplastic material that form a three-dimensional printed object with a variety of shapes and structures. After each layer of the three-dimensional printed object is formed, the thermoplastic material cools and hardens to bond the layer to an underlying layer of the three-dimensional printed object. This additive manufacturing method is distinguishable from traditional object-forming techniques, which mostly rely on the removal of material from a work piece by a subtractive process, such as cutting or drilling.

Many extruders are fed extrusion material filaments that are melted or softened to form the thermoplastic material. Even though the filaments are produced in a full range of colors, current extruders in three-dimensional object printers have very limited color capability. Typically, extruded materials of different colors are produced with separate extruders that extrude material of only one color. Because the extruded thermoplastic material possesses high viscosity, the different extruded materials are difficult to mix. Therefore, most printers of this type are limited to two differently colored materials. The differently colored materials from two separate extruders can be used to make a color image in or on an object by printing a base of the object in one color and a pattern in the second color on top of the base. Adding multiple extruders to a printer adds greatly to the complexity of the printer, but only provides a limited color range. Making an outline of an object with extruded thermoplastic materials from multiple extruders invariably leaves breaks in the surface. To avoid these breaks, different colors are alternated from one layer to another.

Another printer configuration used to produce differently colored extruded materials uses a filament splicer that produces a single multi-color filament from a plurality of differently colored extrusion material filaments by combining them serially lengthwise. The single multi-color filament is fed to a heater that feeds a single extruder. Thus, the thermoplastic material extruded by the extruder changes as the differently colored sections of the filament are melted or softened. The splicer pre-calculates the amount of a thermoplastic material required to form a portion of the object having a particular color and a segment of an extrusion material filament of that color is spliced into the single filament. By continuing to splice an appropriate length of a filament of another color to the single filament, the extruder can continue to produce the object until its formation is complete. This splicer is primarily used to form areas of solid color in the object. The use of the splicer requires precise calculations regarding the lengths of the different filament segments to form the single filament and limits the resolution of the thermoplastic materials extruded by the extruder. Additionally, detecting whether the delivery of the thermoplastic material produced from the multi-colored filament is synchronized with the formation of the appropriate object portions is difficult.

Providing a three-dimensional object printer with a greater range of colors over known printers and enabling a variety of techniques for forming the object would be beneficial.

SUMMARY

A new extruder uses extrusion materials having a range of different properties and arranges the different extruded materials with more flexibility to form objects. The apparatus includes an extruder having a plurality of manifolds and a plurality of nozzles, each manifold being configured to store thermoplastic material and each manifold being operatively connected to at least one nozzle in the plurality of nozzles through which thermoplastic material from the manifold can be emitted and no two of the manifolds are operatively connected to a same nozzle, and a faceplate having a plurality of apertures, each aperture in the faceplate being configured to receive thermoplastic material extruded from a nozzle in the plurality of nozzles in a one-to-one correspondence to enable the extruded thermoplastic material to pass through the aperture.

A new method operates an extruder to use extrusion materials having a range of different properties and to arrange the different extruded materials with more flexibility to form objects. The method includes supplying a plurality of thermoplastic materials to a plurality of manifolds in an extruder in a one-to-one correspondence, each manifold being operatively connected to a different nozzle of the extruder and each thermoplastic material having a property that is different than the property of the other thermoplastic materials, and extruding thermoplastic material from the different nozzles of the extruder through a plurality of apertures in a faceplate.

BRIEF DESCRIPTION OF THE DRAWINGS

The foregoing aspects and other features of systems that form objects with thermoplastic material extruded from extruders are explained in the following description, taken in connection with the accompanying drawings.

DETAILED DESCRIPTION

Figure 1:
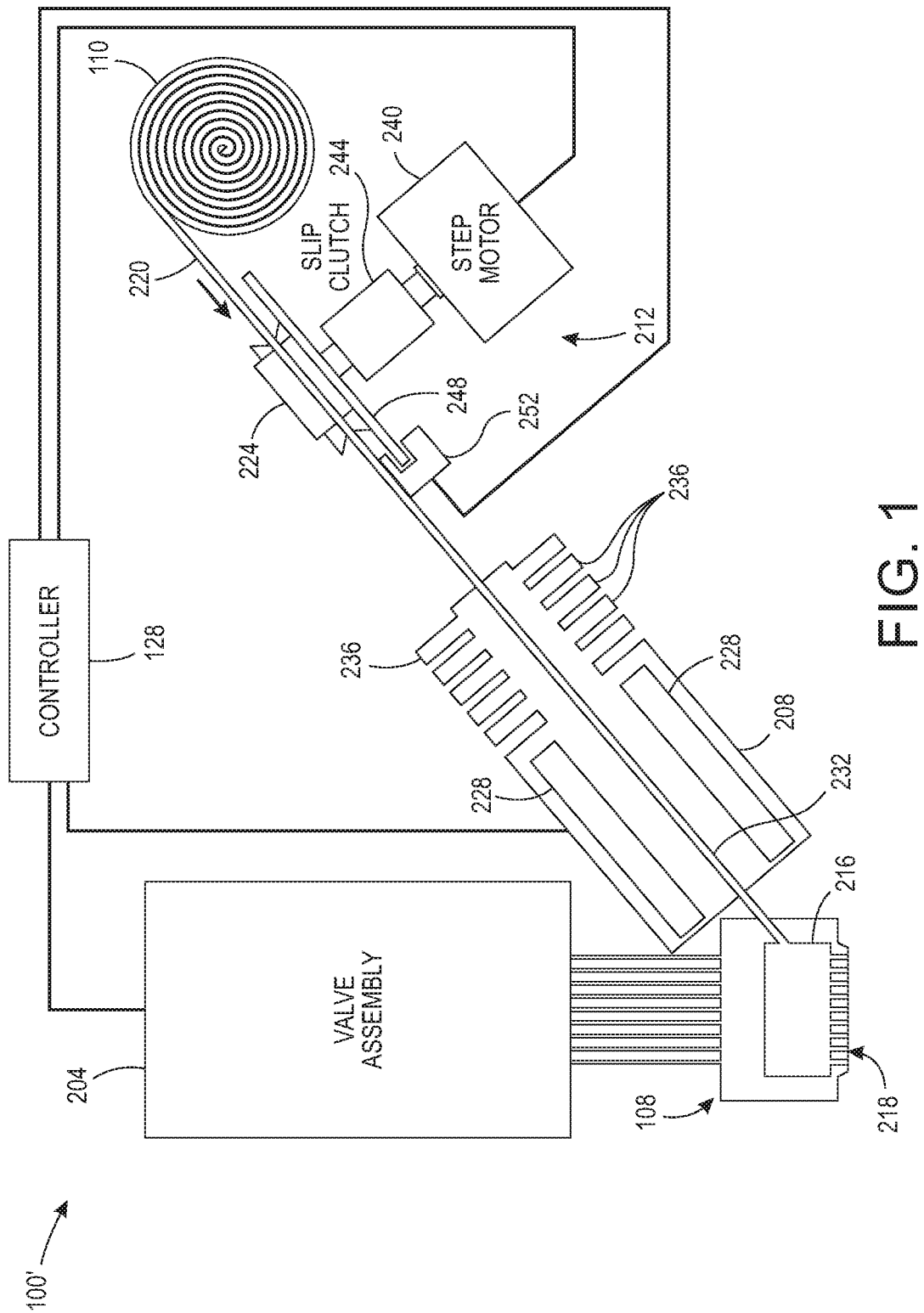
FIG. 1 depicts an additive manufacturing system that enables a greater range of colors for the thermoplastic materials extruded by an extruder and more flexibility in forming objects with the extruded materials.

For a general understanding of the environment for the device disclosed herein as well as the details for the device, reference is made to the drawings. In the drawings, like reference numerals designate like elements.

As used herein, the term "extrusion material" refers to a material that is softened or melted to form thermoplastic material to be emitted by an extruder in an additive manufacturing system. The extrusion materials include, but are not strictly limited to, both "build materials" that form permanent portions of the three-dimensional printed object and "support materials" that form temporary structures to support portions of the build material during a printing process and are then optionally removed after completion of the printing process. Examples of build materials include, but are not limited to, acrylonitrile butadiene styrene (ABS) plastic, polylactic acid (PLA), aliphatic or semi-aromatic polyamides (Nylon), plastics that include suspended carbon fiber or other aggregate materials, electrically conductive polymers, and any other form of material that can be thermally treated to produce thermoplastic material suitable for emission through an extruder. Examples of support materials include, but are not limited to, high-impact polystyrene (HIPS), polyvinyl alcohol (PVA), and other materials capable of extrusion after being thermally treated. In some extrusion printers, the extrusion material is supplied as continuous elongated length of material commonly known as a "filament." This filament is provided in a solid form by one or more rollers pulling the extrusion material filament from a spool or other supply and feeding the filament into a heater that is fluidly connected to a manifold within the extruder. The heater softens or melts the extrusion material filament to form a thermoplastic material that flows into the manifold. When a valve positioned between a nozzle and the manifold is opened, a portion of the thermoplastic material flows from the manifold through the nozzle and is emitted as a stream of thermoplastic material. As used herein, the term "melt" as applied to extrusion material refers to any elevation of temperature for the extrusion material that softens or changes the phase of the extrusion material to enable extrusion of the thermoplastic material through one or more nozzles in a extruder during operation of a three-dimensional object printer. The melted extrusion material is also denoted as "thermoplastic material" in this document. As those of skill in the art recognize, certain amorphous extrusion materials do not transition to a pure liquid state during operation of the printer.

As used herein, the terms "extruder" refers to a component of a printer that melts extrusion material in a single fluid chamber and provides the melted extrusion material to a manifold connected to one or more nozzles. Some extruders include a valve assembly that can be electronically operated to enable thermoplastic material to flow through nozzles selectively. The valve assembly enables the independent connecting of one or more nozzles to the manifold to extrude the thermoplastic material. As used herein, the term "nozzle" refers to an orifice in an extruder that is fluidly connected to the manifold in an extruder and through which thermoplastic material is emitted towards an image receiving surface. During operation, the nozzle can extrude a substantially continuous linear arrangement of the thermoplastic material along the process path of the extruder. A controller operates the valves in the valve assembly to control which nozzles connected to the valve assembly extrude thermoplastic material. The diameter of the nozzle affects the width of the line of extruded thermoplastic material. Different extruder embodiments include nozzles having a range of orifice sizes with wider orifices producing lines having widths that are greater than the widths of lines produced by narrower orifices.

As used herein, the term "manifold" refers to a cavity formed within a housing of an extruder that holds a supply of thermoplastic material for delivery to one or more nozzles in the extruder during a three-dimensional object printing operation. As used herein, the term "arrangement of extrusion material" refers to any pattern of the extrusion material that the extruder forms on an image receiving surface during a three-dimensional object printing operation. Common arrangements of extrusion material include straight-line linear arrangements of the extrusion material and curved arrangements of the extrusion material. In some configurations, the extruder extrudes the thermoplastic material in a continuous manner to form the arrangement with a contiguous mass of the extrusion material while in other configurations the extruder operates in an intermittent manner to form smaller groups of thermoplastic material that are arranged along a linear or curved path. The three-dimensional object printer forms various structures using combinations of different arrangements of the extrusion material. Additionally, a controller in the three-dimensional object printer uses object image data and extruder path data that correspond to different arrangements of the extrusion material prior to operating the extruder to form each arrangement of the extrusion material. As described below, the controller optionally adjusts the operation of the valve assembly to form multiple arrangements of thermoplastic material through one or more nozzles during a three-dimensional printing operation.

As used herein, the term "process direction" refers to a direction of relative movement between an extruder and an image receiving surface that receives thermoplastic material extruded from one or more nozzles in the extruder. The image receiving surface is either a support member that holds a three-dimensional printed object or a surface of the partially formed three-dimensional object during an additive manufacturing process. In the illustrative embodiments described herein, one or more actuators move the extruder about the support member, but alternative system embodiments move the support member to produce the relative motion in the process direction while the extruder remains stationary. Some systems use a combination of both systems for different axes of motion.

As used herein, the term "cross process direction" refers to an axis that is perpendicular to the process direction in the plane of the process direction. The process direction and cross-process direction refer to the relative path of movement of the extruder and the surface that receives the thermoplastic material. In some configurations, the extruder includes an array of nozzles that extend along the cross-process direction. Adjacent nozzles within the extruder are separated by a predetermined distance in the cross-process direction. In some configurations, the system rotates the extruder to adjust the effect cross-process direction distance that separates different nozzles in the extruder to adjust the corresponding cross-process direction distance that separates arrangements of the thermoplastic material that are extruded from the nozzles in the extruder.

During operation of the additive manufacturing system, an extruder moves in the process direction along both straight and curved paths relative to a surface that receives thermoplastic material during the three-dimensional object printing process. Additionally, an actuator in the system optionally rotates the extruder about the Z axis to adjust the effective cross-process distance that separates nozzles in the extruder to enable the extruder to form two or more arrangements of thermoplastic material with predetermined distances between each arrangement of the thermoplastic material. The extruder moves both along the outer perimeter to form outer walls of a two-dimensional region in a layer of the printed object and within the perimeter to fill all or a portion of the two-dimensional region with the thermoplastic material.

Figure 7:
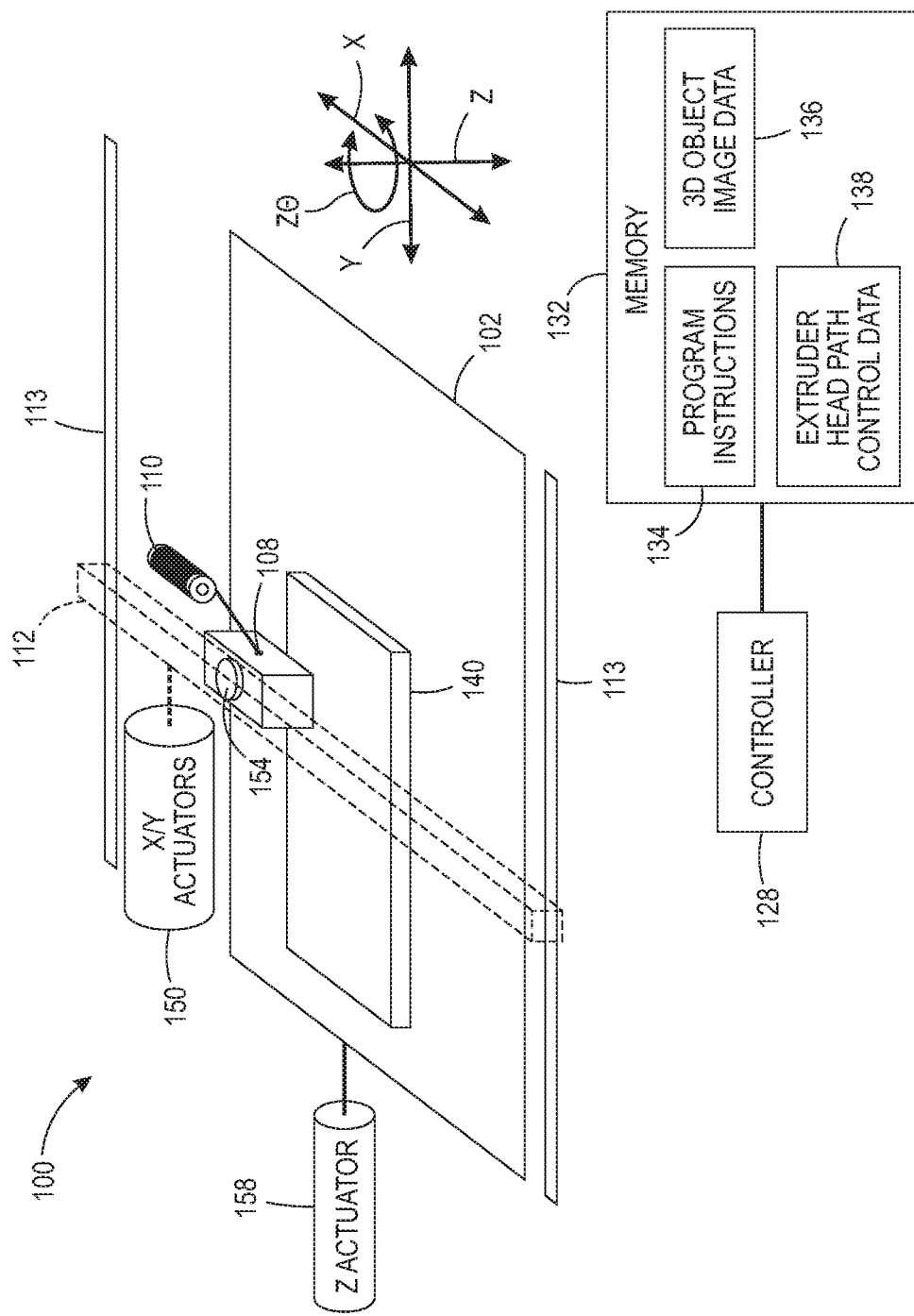
FIG. 7 is a diagram of a prior art three-dimensional object printer.

FIG. 7 depicts a prior art three-dimensional object additive manufacturing system or printer 100 that is configured to operate an extruder 108 to form a three-dimensional printed object 140. Although the printer 100 is depicted as a printer that uses planar motion to form an object, other printer architectures can be used with the extruder and mechanical mover of extrusion material described in this document. These architectures include delta-bots, selective compliance assembly robot arms (SCARAs), multi-axis printers, non-Cartesian printers, and the like. The printer 100 includes a support member 102, a multi-nozzle extruder 108, extruder support arm 112, controller 128, memory 132, X/Y actuators 150, an optional Zθ actuator 154, and a Z actuator 158. In the printer 100, the X/Y actuators 150 move the extruder 108 to different locations in a two-dimensional plane (the "X-Y plane") along the X and Y axes to extrude arrangements of thermoplastic material that form one layer in a three-dimensional printed object, such as the object 140 that is depicted in FIG. 7. For example, in FIG. 7 the X/Y actuators 150 translate the support arm 112 and extruder 108 along guide rails 113 to move along the Y axis while the X/Y actuators 150 translate the extruder 108 along the length of the support arm 112 to move the extruder along the X axis. The extruded patterns include both outlines of one or more regions in the layer and swaths of the thermoplastic material that fill in the regions within the outline of thermoplastic material patterns. The Z actuator 158 controls the distance between the extruder 108 and the support member 102 along the Z axis to ensure that the nozzles in the extruder 108 remain at a suitable height to extrude thermoplastic material onto the object 140 as the object is formed during the printing process. The Zθ actuator 154 controls an angle of rotation of the extruder 108 about the Z axis (referenced as Zθ in FIG. 4) for some embodiments of the extruder 108 that rotate about the Z axis. This movement controls the separation between nozzles in the extruder 108, although some extruders do not require rotation during the manufacturing process. In the system 100, the X/Y actuators 150, Zθ actuator 154, and the Z actuator 158 are embodied as electromechanical actuators, such as electric motors, stepper motors, or any other suitable electromechanical device. In the illustrative embodiment of FIG. 7, the three-dimensional object printer 100 is depicted during formation of a three-dimensional printed object 140 that is formed from a plurality of layers of thermoplastic material.

Figure 6:
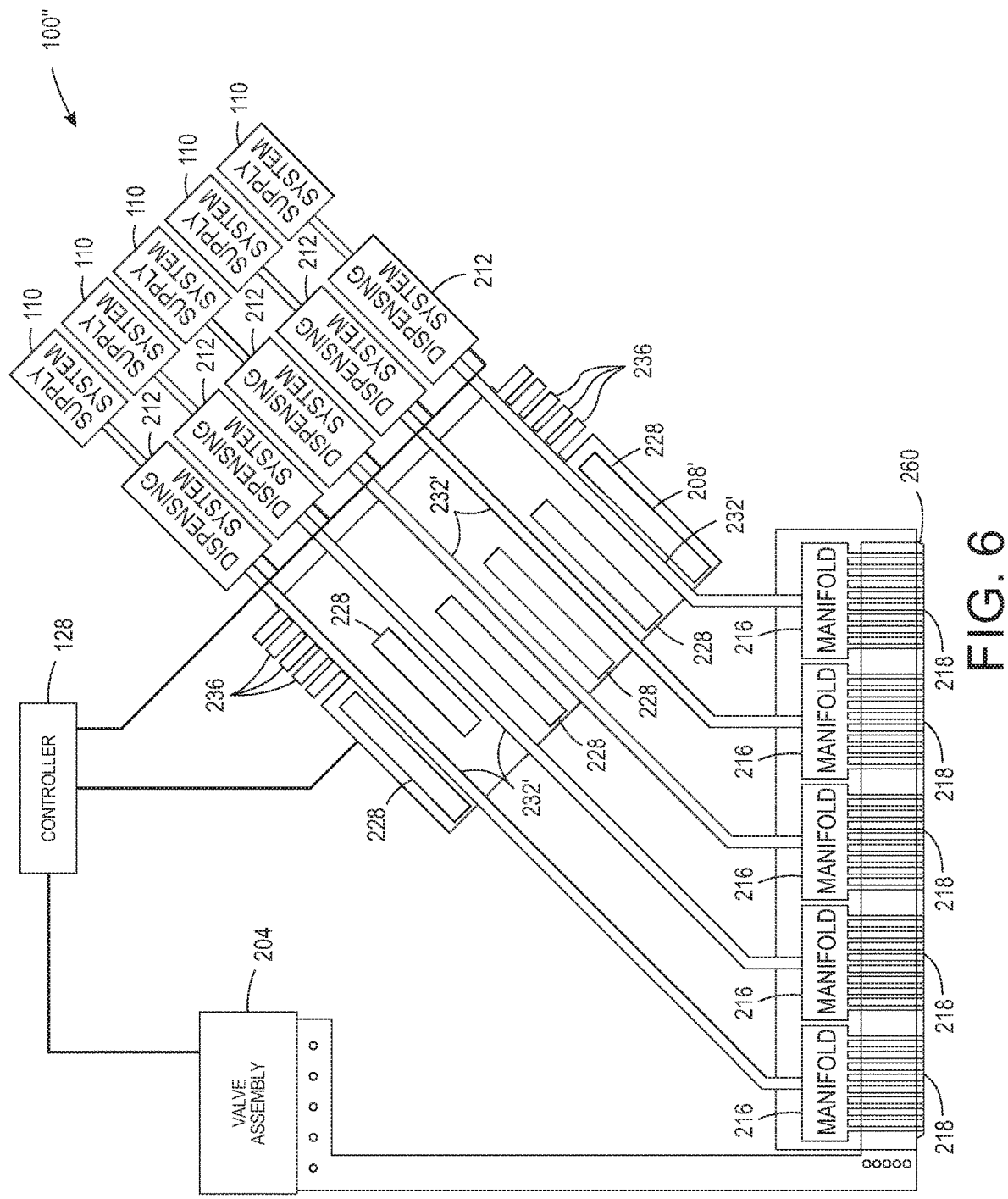
FIG. 6 is a block diagram of an alternative embodiment of the system shown in FIG. 1 that has only one heater with a plurality of channels.

The support member 102 is a planar member, such as a glass plate, polymer plate, or foam surface, which supports the three-dimensional printed object 140 during the manufacturing process. In the embodiment of FIG. 6, the Z actuator 158 also moves the support member 102 in the direction Z away from the extruder 108 after application of each layer of thermoplastic material to ensure that the extruder 108 maintains a predetermined distance from the upper surface of the object 140. The extruder 108 includes a plurality of nozzles and each nozzle extrudes thermoplastic material onto the surface of the support member 102 or a surface of a partially formed object, such the object 140. In the example of FIG. 7, extrusion material is provided as a filament from extrusion material supply 110, which is a spool of ABS plastic or another suitable extrusion material filament that unwraps from the spool to supply extrusion material to the extruder 108.

The support arm 112 includes a support member and one or more actuators that move the extruder 108 during printing operations. In the system 100, one or more actuators 150 move the support arm 112 and extruder 108 along the X and Y axes during the printing operation. For example, one of the actuators 150 moves the support arm 112 and the extruder 108 along the Y axis while another actuator moves the extruder 108 along the length of the support arm 112 to move along the X axis. In the system 100, the X/Y actuators 150 optionally move the extruder 108 along both the X and Y axes simultaneously along either straight or curved paths. The controller 128 controls the movements of the extruder 108 in both linear and curved paths that enable the nozzles in the extruder 108 to extrude thermoplastic material onto the support member 102 or onto previously formed layers of the object 140. The controller 128 optionally moves the extruder 108 in a rasterized motion along the X axis or Y axis, but the X/Y actuators 150 can also move the extruder 108 along arbitrary linear or curved paths in the X-Y plane.

The controller 128 is a digital logic device such as a microprocessor, microcontroller, field programmable gate array (FPGA), application specific integrated circuit (ASIC) or any other digital logic that is configured to operate the printer 100. In the printer 100, the controller 128 is operatively connected to one or more actuators that control the movement of the support member 102 and the support arm 112. The controller 128 is also operatively connected to a memory 132. In the embodiment of the printer 100, the memory 132 includes volatile data storage devices, such as random access memory (RAM) devices, and non-volatile data storage devices such as solid-state data storage devices, magnetic disks, optical disks, or any other suitable data storage devices. The memory 132 stores programmed instruction data 134 and three-dimensional (3D) object image data 136. The controller 128 executes the stored program instructions 134 to operate the components in the printer 100 to form the three-dimensional printed object 140 and print two-dimensional images on one or more surfaces of the object 140. The 3D object image data 136 includes, for example, a plurality of two-dimensional image data patterns that correspond to each layer of thermoplastic material that the printer 100 forms during the three-dimensional object printing process. The extruder path control data 138 include a set of geometric data or actuator control commands that the controller 128 processes to control the path of movement of the extruder 108 using the X/Y actuators 150 and to control the orientation of the extruder 108 using the Zθ actuator 154. The controller 128 operates the actuators to move the extruder 108 above the support member 102 as noted above while the extruder extrudes thermoplastic material to form an object.

Figure 2:
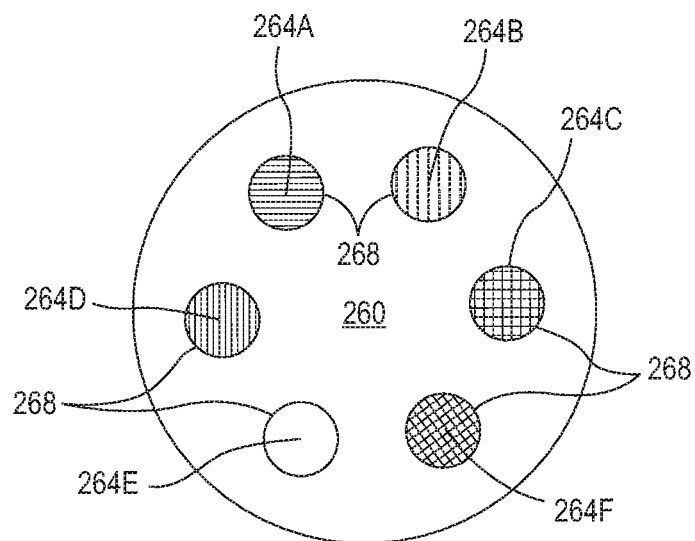
FIG. 2 is a configuration of a faceplate and extruder nozzles that can be used in the system of FIG. 1.

FIG. 1 depicts an additive manufacturing system 100' having an extruder 108 that extrudes a plurality of thermoplastic materials through apertures in a faceplate as shown in FIG. 2, which is described in more detail below. Although only one manifold 216 is shown in FIG. 1 to simplify the figure, the extruder 108 has a plurality of manifolds 216. In one embodiment, each manifold 216 in the extruder 108 is operatively connected to a different heater 208 that is fed by a different extrusion material supply 110 in a one-to-one correspondence. Alternatively, each manifold 216 can be coupled to a single heater 208' that houses a plurality of channels 232' that are fed by a plurality of extrusion material supplies 110 as shown in the embodiment 100" of FIG. 6. Each channel 232' in FIG. 6 supplies thermoplastic material to a manifold 216 in the extruder 108 to enable each manifold to receive a material that is different than a material that the other manifolds are receiving. In the extruder 108, each nozzle 218 is fluidly connected to only one of the manifolds within the extruder 108 so each nozzle can extrude a thermoplastic material that is different than the materials extruded from nozzles connected to other manifolds. Extrusion from each nozzle is selectively and independently activated and deactivated by controller 128 operating the valves in the valve assembly 204. Each nozzle 218 is also aligned with an aperture in a faceplate 260, as described in more detail below, to configure the nozzles for more flexible formation of arrangements of the materials in an object. The configuration of FIG. 6 corresponds with an embodiment of the faceplate similar to the one shown in FIG. 4B, but which provides three nozzles for each of the five manifolds rather than three nozzles for six manifolds as depicted in FIG. 4B.

In the embodiments of FIG. 1 and FIG. 6, a valve assembly 204 positions a valve between the manifolds in the extruder 108 and each of the nozzles connected to the manifolds in the extruder 108. The valve assembly 204 is operatively connected to the controller 128 so the controller can open and close the valves for extruding thermoplastic material from the plurality of nozzles in the extruder 108. Specifically, the controller 128 activates and deactivates different actuators in the assembly 204 connected to the valves in the extruder 108 to extrude thermoplastic material from the nozzles and form arrangements of different thermoplastic materials in each layer of the three-dimensional printed object 140.

The system 100' of FIG. 1 also includes an extrusion material dispensing system 212 for each heater 208 that is connected to a manifold in the extruder 108. The extrusion material from each separate supply 110 is fed to the corresponding heater 208 at a rate that maintains the pressure of the thermoplastic material in the manifold connected to the heater within a predetermined range during operation of the system 100'. The dispensing system 212 is one embodiment that is suitable for regulating pressure of the thermoplastic material in each manifold of the extruder 108. In embodiment 100" of FIG. 6, a plurality of extrusion material dispensing systems 212 are operatively connected between a plurality of extrusion material supplies 110 and a channel 232' in the heater 208' in a one-to-one correspondence. Additionally, in both embodiments, the controller 128 is operatively connected to an actuator each dispensing system 212 to control the rate at which the dispensing system 212 delivers extrusion material from a supply 110 to the heater fed by the supply. The dispensing systems 212 of FIG. 6 can be configured as the dispensing system 212 of FIG. 1. The heaters 208 and 208' soften or melt the extrusion material 220 fed to the heater 208 via drive roller 224 (FIG. 1). Actuator 240 drives the roller 224 and is operatively connected to the controller 128 so the controller can regulate the speed at which the actuator drives the roller 224. Another roller opposite roller 224 is free-wheeling so it follows the rate of rotation at which roller 224 is driven. While FIG. 1 depicts a feed system that uses an electromechanical actuator and the driver roller 224 as a mechanical mover to move the filament 220 into the heater 208 or 208', alternative embodiments of the dispensing system 212 use one or more actuators to operate a mechanical mover in the form of a rotating auger or screw. The auger or screw moves solid phase extrusion material from a supply 110 in the form of extrusion material powder or pellets into a heater 208 or 208'.

In the embodiments of FIG. 1 and FIG. 6, each heater is formed from stainless steel and includes one or more heating elements 228, such as electrically resistive heating elements, which are operatively connected to the controller 128. Controller 128 is configured to connect the heating elements 228 to electrical current selectively to soften or melt the filament of extrusion material 220 in the channel or channels within the heater 208 or 208'. While FIG. 1 and FIG. 6 show heater 208 and heater 208' receiving extrusion material in a solid phase as solid filament 220, in alternative embodiments, the heaters receive the extrusion material in solid phase as powdered or pelletized extrusion material. Cooling fins 236 attenuate heat in the channels upstream from the heater. A portion of the extrusion material that remains solid in a channel at or near the cooling fins 236 forms a seal in the channel that prevents thermoplastic material from exiting the heater from any other opening than the connection to the manifold 216. The extruder 108 can also include additional heating elements to maintain an elevated temperature for the thermoplastic material within each manifold within the extruder. In some embodiments, a thermal insulator covers portions of the exterior of the extruder 108 to maintain a temperature within the manifolds within the extruder. The reader should appreciate that the length of the nozzles in FIG. 6 is as short as those depicted in FIG. 1 so the thermoplastic material does not begin solidifying during its travel to the apertures in the faceplate.

To maintain a fluid pressure of the thermoplastic material within the manifolds 216 within a predetermined range, avoid damage to the extrusion material, and control the extrusion rate through the nozzles, a slip clutch 244 is operatively connected to the drive shaft of each actuator 240 that feeds filament from a supply 110 to a heater. As used in this document, the term "slip clutch" refers to a device applies frictional force to an object to move the object up to a predetermined set point. When the range about the predetermined set point for the frictional force is exceeded, the device slips so it no longer applies the frictional force to the object. The slip clutch enables the force exerted on the filament 220 to remain constant no matter how frequently or how long a valve within the assembly 204 is opened or how fast the actuator 240 drives roller 224. This constant force can be maintained by either driving the actuator 240 at a speed that is higher than the fastest expected rotational speed of the filament drive roller 224 or by putting an encoder wheel 248 on the roller 224 and sensing the rate of rotation with a sensor 252. The signal generated by the sensor 252 indicates the angular rotation of the roller 224 and the controller 128 receives this signal to identify the speed of the roller 224. The controller 128 is further configured to adjust the signal provided to the actuator 240 to control the speed of the actuator. When the controller is configured to control the speed of the actuator 240, the controller 128 operates the actuator 240 so its speed is slightly faster than the rotation of the roller 224. This operation ensures that the torque on the drive roller 224 is always a function of the slip clutch torque.

The controller 128 has a set point stored in memory connected to the controller that identifies the slightly higher speed of the actuator output shaft over the rotational speed of the roller 224. As used in this document, the term "set point" means a parameter value that a controller uses to operate components to keep the parameter corresponding to the set point within a predetermined range about the set point. For example, the controller 128 changes a signal that operates the actuator 240 to rotate the output shaft at a speed identified by the output signal in a predetermined range about the set point. In addition to the commanded speed for the actuator, the number of valves opened or closed in the valve assembly 204 and the torque set point for the clutch also affect the filament drive system 212 operation. The resulting rotational speed of the roller 224 is identified by the signal generated by the sensor 252. A proportional-integral-derivative (PID) controller within controller 128 identifies an error from this signal with reference to the differential set point stored in memory and adjusts the signal output by the controller to operate the actuator 240. Alternatively, the controller 128 can alter the torque level for the slip clutch or the controller 128 can both alter the torque level and adjust the signal with which the controller operates the actuator.

The slip clutch 244 can be a fixed or adjustable torque friction disc clutch, a magnetic particle clutch, a magnetic hysteresis clutch, a ferro-fluid clutch, an air pressure clutch, or permanent magnetic clutch. The clutch types that operate magnetically can have their torque set points adjusted by applying a voltage to the clutches. This feature enables the torque set point on the clutch to be changed with reference to print conditions. The term "print conditions" refers to parameters of the currently ongoing manufacturing operation that affect the amount of thermoplastic material required in the manifold for adequate formation of the object. These print conditions include the type of extrusion material being fed to the extruder, the temperature of the thermoplastic material being emitted from the extruder, the speed at which the extruder is being moved in the X-Y plane, the position of the feature being formed on the object, and the like.

FIG. 2 shows a faceplate 260 and a configuration of six nozzles 264a, 264b, 264c, 264d, 264e, and 264f, which are aligned with six apertures 268 in the faceplate. As used in this document, the term "faceplate" refers to a single planar member having a plurality of apertures that enable thermoplastic material to be extruded from the nozzles of a plurality of extruders. Use of a single faceplate for a plurality of nozzles in an extruder enables different materials to be printed simultaneously so they join together while at the elevated temperatures. This joining of the different materials helps prevent weak spots in the object being formed; however, the joining of the different materials does not mean the materials mix with one another. Thus, the order and placement of the different materials substantially affects the layers and surfaces of the object.

In the discussion below, the different extrusion materials supplied to a plurality of heaters 208 or a single heater 208' have different colors. The selective formation of arrangements within layers enables the object to be formed with different colors and shades of colors at the surfaces and edges of the object. The reader should understand that the different extrusion materials can have different properties other than color. For example, the different property can be hardness of the material to enable the object to be formed with varying degrees of hardness in different portions of the object. In the discussion below, however, color is the property that is being used to describe the operation of the various embodiments and how they produce variations in portions of an object. As used in this document, the term "property" refers to a characteristic of an extrusion material that can differ for each extrusion material used in an additive manufacturing system.

At an object edge, the color of the material extruded toward the outside of the edge predominates, while at a top surface, the extruded materials can be positioned adjacent one another or over one of the other materials to determine color. When one nozzle is aligned with another nozzle in a direction of travel for the faceplate, the later extruded material lays on the earlier extruded material so it tends to dominate the color appearance of the top surface. For example, in FIG. 2, nozzles 264a and 264b are aligned when the faceplate travels left to right or right to left. Therefore, when the faceplate travels to the right, the color of the material from nozzle 264a tends to dominate the appearance of the top surface, and when the faceplate travels to the left, the color of the material from nozzle 264b tends to dominate. By manipulating the flow of thermoplastic materials from the nozzles and rotating the faceplate to orient the nozzles differently, the color perceived at the visible portions of the object can be controlled. Where color cannot be perceived, such as the interior of an object, all of the nozzles can operated to form the arrangements for an object and maximize the printing speed.

Figure 3:
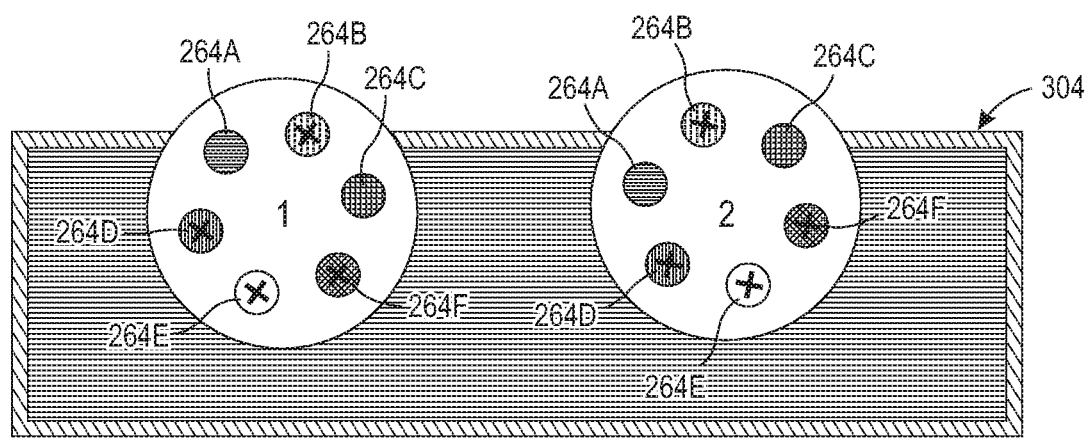
FIG. 3 illustrates an operation of the configuration shown in FIG. 2 to produce color in an object.

In FIG. 2, for example, nozzle 264a emits cyan colored material, nozzle 264b emits magenta colored material, nozzle 264d emits yellow colored material, and nozzle 264f emits black colored material. White is also useful for varying colors so nozzle 264e extrudes white colored material, while nozzle 264c extrudes red colored material. This selection of colors is exemplary only as the filaments feeding the heaters 208 for the various manifolds in the extruders 108 can be any known filament color. FIG. 3 illustrates the use of the configuration of FIG. 2 being operated to form a green edge of a rectangular object 304. The "X"s in the nozzles 264b, 264d, 264e, and 264f indicate the valves feeding those nozzles have been closed. Thus, only cyan material from nozzle 264a and yellow material from nozzle 264c are extruded. Regardless of the direction in which the faceplate 260 is moved, either right to left or left to right, the faceplate 260 is rotated about an axis perpendicular to the faceplate 260 between orientation 1 and orientation 2 as shown in the figure. In orientation 1, cyan dominates, while in orientation 2, yellow dominates. By alternating between the two orientations, an edge is formed that a human observer perceives as being green. The amount of time that one orientation is used versus the other orientation determines the shade of green that an observer perceives. The reader should also note that the nozzles 264b, 264d, 264e, and 264f can remain open without compromising the color of the edge since the nozzles extruding the cyan and yellow materials remain at the outside of the object provided the cyan and yellow materials are relative opaque. If the cyan and yellow materials are relatively highly translucent, then white material may be required to avoid degradation of the color being formed. Formation of corners may require the closing of the nozzles not extruding cyan or yellow materials prior to or while the faceplate is turning through a corner, but, in some cases, the use of these nozzles can be useful for gradually shaping curves.

While the example discussed with reference to FIG. 3 uses only two colors, any number of colors and orientations can be used to form colors at an edge or surface of an object. Also, lighter or darker shades of a color can be produced by including white or black extruded materials, respectively. The rate at which ejectors are alternated and the selective activation of the nozzles that extrude material at a surface of the object determine how finely the variations between colors can be detailed and how accurately desired color changes can be produced at the edges and surfaces of objects.

Figure 4A:
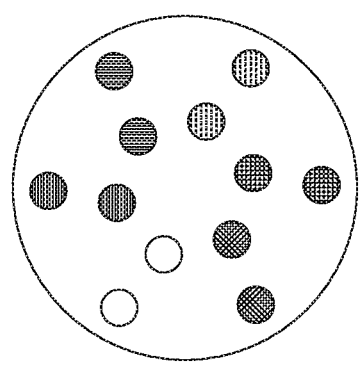
FIG. 4A and 4B depict alternative embodiments of faceplate and extruder nozzle configurations.
Figure 4B:
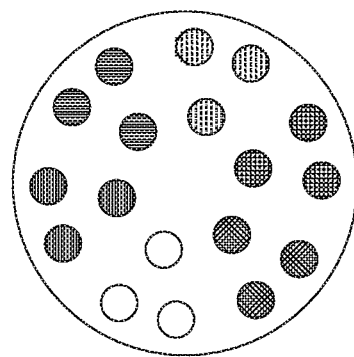

Alternative embodiments of the faceplate 260 and other configurations of the plurality of extruders are shown in FIG. 4A and 4B. In these embodiments, each color of thermoplastic material provided by the nozzles in faceplate 260 of FIG. 2 is extruded through a plurality of nozzles. For example, each of the cyan, magenta, yellow, black, white, and red colored materials are provided through two nozzles in the faceplate 260' of FIG. 4A, while each of those colors of materials are provided through three nozzles in the faceplate 260" of FIG. 4B. Each of the nozzles extruding the same color are connected to the same manifold in the extruder 108 and a different valve in the assembly 204 is positioned between that manifold and each nozzle. Thus, the controller 128 can operate the valve assembly 204 to open or close all of the nozzles or only selected nozzles for a particular color. Additionally, each of the nozzles for a single color can have the same diameter or different diameters. Thus, the embodiments of FIG. 4A and 4B enhance the flexibility and resolution of the arrangements of extruded thermoplastic materials through the faceplates of these embodiments. Moreover, if the nozzles are arranged in the faceplates so the different colors overlap uniformly, each of the nozzles for a single color can be sequenced by independently operating the valves for the nozzles to produce an effect similar to the one discussed above with reference to FIG. 3. Additionally, the operation of the valves can be combined with different rotations of the faceplate to add further flexibility to the formation of colors for the object.

Figure 5:
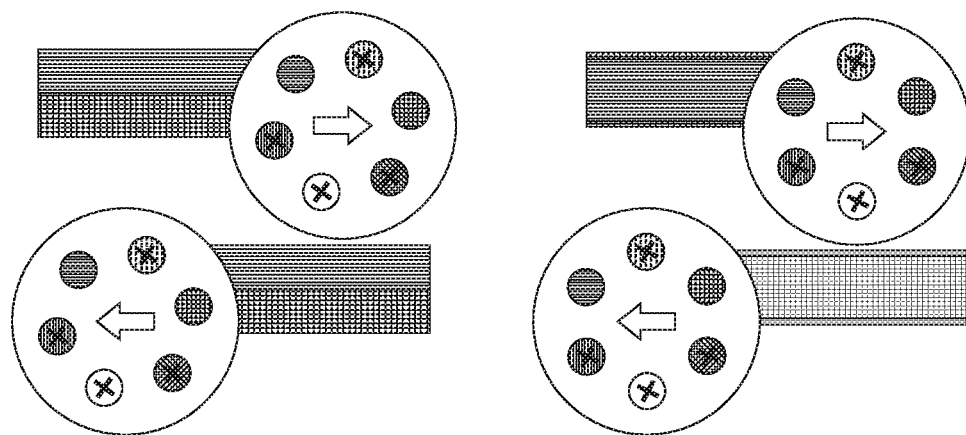
FIG. 5 illustrates the use of the faceplate and extruder nozzle configuration of FIG. 2 to produce different colors in an object.

The orientations 1 and 2 depicted in FIG. 3 can be used as shown in FIG. 5 to produce different color effects on a surface of the object as viewed from a perspective looking down on the surface of the object. On the left side of the figure, orientation 1 produces cyan thermoplastic material that is adjacent to yellow thermoplastic material regardless of which direction the faceplate is moved. Similarly, if orientation 2 was used, the two materials are reversed, but are still adjacent to one another regardless of faceplate movement direction. On the right, an orientation is shown that aligns the nozzle 264a with nozzle 264c. When the faceplate moves to the right as indicated by the arrow in the upper right depiction, the cyan thermoplastic material covers the yellow thermoplastic material, but if the same orientation is move to the left as indicated by the arrow in the lower right depiction, the yellow material covers the cyan material. Thus, color formation for an object can be affected by rotating the faceplate, controlling the valves between the manifolds and the nozzles, and moving the faceplate in a particular direction.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. An apparatus comprising:
    an extruder having a plurality of manifolds and a plurality of nozzles, each manifold being configured to store thermoplastic material and each manifold being operatively connected to at least one nozzle in the plurality of nozzles through which thermoplastic material from the manifold can be emitted and no two of the manifolds are operatively connected to a same nozzle;
    a faceplate having a plurality of apertures, each aperture in the faceplate being configured to receive thermoplastic material extruded from a nozzle in the plurality of nozzles in a one-to-one correspondence to enable the extruded thermoplastic material to pass through the aperture;
    at least one valve being operatively connected between a nozzle in the plurality of nozzles and the manifold to which the nozzle is operatively connected in the extruder, the at least one valve being configured to open and close the nozzle selectively;
    a plurality of extrusion material supplies, each extrusion material supply being configured to supply extrusion material having a property that is different than the property of extrusion material provided by the other extrusion material supplies in the plurality of extrusion material supplies;
    at least one heater having a plurality of channels, each channel of the at least one heater being operatively connected to only one extrusion material filament supply in the plurality of extrusion material filament supplies in a one-to-one correspondence between the plurality of channels and the plurality of extrusion material supplies and each channel in the heater being operatively connected to only one manifold in the extruder in a one-to-one correspondence between the plurality of channels and the plurality of manifolds in the extruder to enable thermoplastic material produced by each channel to enter the manifold to which the channel is operatively connected; and
    a plurality of mechanical movers, each mechanical mover being configured to move extrusion material from the extrusion material supply operatively connected to one of the channels in the heater, each mechanical mover also being configured for independent control of a rate at which the extrusion material is supplied to the channel in the heater that is operatively connected to the extrusion material supply; and
    a controller configured to operate the at least one valve to extrude thermoplastic material from each nozzle selectively.

2. The apparatus of claim 1 wherein at least one manifold is operatively connected to at least two nozzles.

3. The apparatus of claim 1, the extruder and the faceplate being configured to move relative to an object in more than one direction.

4. The apparatus of claim 3 wherein the faceplate and the plurality of nozzles are configured for rotation about an axis perpendicular to the faceplate.

5. The apparatus of claim 4 wherein at least one manifold is operatively connected to more than one nozzle and none of the nozzles operatively connected to the at least one manifold are operatively connected to any other manifold of the extruder.

6. The apparatus of claim 5 wherein the at least one valve comprises a plurality of valves, each valve being operatively connected between the at least one manifold and each nozzle operatively connected to the at least one manifold, each valve being configured to open and close the nozzle operatively connected to the at least one manifold selectively; and
    a controller operatively connected to each valve that is operatively connected between the at least one manifold and each nozzle operatively connected to the at least one manifold, the controller being configured to operate each valve to extrude thermoplastic material from each nozzle operatively connected to the at least one manifold selectively.

7. The apparatus of claim 6 further comprising:

another valve operatively connected between another nozzle in the plurality of nozzles and another manifold in the plurality of manifolds other than the at least one manifold;

at least one actuator operatively connected to the extruder; and the controller also being operatively connected to the other valve and the at least one actuator, the controller being further configured to:

operate the at least one actuator to move the extruder in a direction and to orient the apertures of the faceplate;

operate the valves operatively connected between the at least one manifold and nozzles operatively connected to the at least one manifold; and operate the other valve operatively connected between the other manifold and the other nozzle operatively connected to the other manifold to enable at least one of the nozzles operatively connected to the at least one manifold and the other nozzle operatively connected to the other manifold to extrude thermoplastic material simultaneously.

8. The apparatus of claim 7, the controller being further configured to operate the at least one actuator to orient the apertures of the faceplate to enable thermoplastic material extruded from the at least one nozzle operatively connected to the at least one manifold and thermoplastic material extruded from the other nozzle operatively connected to the other manifold to be adjacent to one another.

9. The apparatus of claim 7, the controller being further configured to operate the at least one actuator to orient the apertures of the faceplate to enable thermoplastic material extruded from the at least one nozzle operatively connected to the at least one manifold to be placed on thermoplastic material extruded from the other nozzle operatively connected to the other manifold.

10. The apparatus of claim 1 wherein the at least one heater comprises a plurality of heaters, each heater being operatively connected to only one extrusion material filament supply in the plurality of extrusion material filament supplies in a one-to-one correspondence between the plurality of channels and the plurality of extrusion material supplies and each heater being operatively connected to only one manifold in the extruder in a one-to-one correspondence between the plurality of heaters and the plurality of manifolds in the extruder to enable thermoplastic material produced by each channel to enter the manifold to which the channel is operatively connected.

* * * * *